US009580642B2

(12) United States Patent
Brannon et al.

(10) Patent No.: US 9,580,642 B2
(45) Date of Patent: Feb. 28, 2017

(54) METHOD FOR IMPROVING ISOLATION OF FLOW TO COMPLETED PERFORATED INTERVALS

(71) Applicant: Baker Hughes Incorporated, Houston, TX (US)

(72) Inventors: Harold Dean Brannon, Magnolia, TX (US); Harold Gene Hudson, The Woodlands, TX (US); Scott Gregory Nelson, Cypress, TX (US); D. V. Satyanarayana Gupta, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 14/556,883

(22) Filed: Dec. 1, 2014

(65) Prior Publication Data

US 2015/0083423 A1    Mar. 26, 2015

Related U.S. Application Data

(63) Continuation-in-part of application No. 14/512,232, filed on Oct. 10, 2014, which is a continuation-in-part of application No. 14/461,123, filed on Aug. 15, 2014, which is a continuation-in-part of application No. 13/928,006, filed on Jun. 26, 2013, which is a continuation-in-part of application No. 13/302,722, filed on Nov. 22, 2011, now Pat. No. 8,899,332.

(60) Provisional application No. 61/664,640, filed on Jun. 26, 2012.

(51) Int. Cl.
| | |
|---|---|
| C09K 8/80 | (2006.01) |
| E21B 43/267 | (2006.01) |
| E21B 33/134 | (2006.01) |
| E21B 43/30 | (2006.01) |
| E21B 21/00 | (2006.01) |
| C09K 8/512 | (2006.01) |
| C09K 8/516 | (2006.01) |
| C09K 8/62 | (2006.01) |

(52) U.S. Cl.
CPC ............ *C09K 8/805* (2013.01); *C09K 8/512* (2013.01); *C09K 8/516* (2013.01); *C09K 8/62* (2013.01); *E21B 21/003* (2013.01); *E21B 33/134* (2013.01); *E21B 43/267* (2013.01); *E21B 43/305* (2013.01); *C09K 2208/18* (2013.01)

(58) Field of Classification Search
CPC ....... C09K 8/508; C09K 8/685; E21B 21/003; E21B 33/12
USPC .......................... 166/308.1, 308.5, 285, 292
See application file for complete search history.

(56) References Cited

U.S. PATENT DOCUMENTS

| | | | |
|---|---|---|---|
| 4,021,355 A | 5/1977 | Holtmyer et al. | |
| 4,191,249 A | 3/1980 | Sarem | |
| 4,202,795 A | 5/1980 | Burnham et al. | |
| 4,463,810 A | 8/1984 | Hill | |
| 5,253,711 A | 10/1993 | Mondshine | |
| 5,311,946 A | 5/1994 | Harry et al. | |
| 5,316,792 A | 5/1994 | Harry et al. | |
| 5,422,183 A | 6/1995 | Sinclair et al. | |
| 5,547,026 A * | 8/1996 | Brannon ................ | C09K 8/514 166/294 |
| 5,667,718 A | 9/1997 | Jones et al. | |
| 5,699,860 A | 12/1997 | Grundmann | |
| 6,059,034 A * | 5/2000 | Rickards ................ | C09K 8/805 166/280.2 |
| 6,330,916 B1 | 12/2001 | Rickards et al. | |
| 6,364,018 B1 | 4/2002 | Brannon et al. | |
| 6,749,025 B1 | 6/2004 | Brannon et al. | |
| 6,772,838 B2 | 8/2004 | Dawson et al. | |
| 7,207,386 B2 | 4/2007 | Brannon et al. | |
| 7,290,614 B2 | 11/2007 | Smith et al. | |
| 7,322,411 B2 | 1/2008 | Brannon et al. | |
| 7,426,961 B2 | 9/2008 | Stephenson et al. | |
| 7,491,682 B2 | 2/2009 | Gupta et al. | |
| 7,493,955 B2 | 2/2009 | Gupta et al. | |
| 7,584,791 B2 | 9/2009 | Robb et al. | |
| 7,598,209 B2 | 10/2009 | Kaufman et al. | |

(Continued)

OTHER PUBLICATIONS

"Scale Removal and Control"; Halliburton Services Manual, Sep. 28, 1993, 4 pgs.

(Continued)

*Primary Examiner* — Doug Hutton, Jr.
*Assistant Examiner* — Silvania Runyan
(74) *Attorney, Agent, or Firm* — John Wilson Jones; Jones Delflache LLP

(57) ABSTRACT

A method for building a plug in a horizontal wellbore using a fluid pill containing a suspended well treatment composite. The well treatment composite contains a core comprising at least one deformable particulate and at least one dissolvable diverter. At least a portion of the surface of the core is coated with at least one viscosifying polymer and at least one crosslinking agent. The fluid pill is pumped into the wellbore at the end of a fracturing treatment and the fluid pill may be displaced by a displacement fluid. The fluid pill may be diverted to an area of lower permeability by disassociating the dissolvable diverter from the core. The disassociated diverter blocks an area of higher permeability. The sized particle distribution of the diverter is sufficient to at least partially block the penetration of fluid into the high permeability zone. In the lower permeability zone, a thickened gel is formed by the in-situ reaction of the viscosifying polymer and crosslinking. Deformable particulates in the gelled fluid form a bridge plug.

25 Claims, 2 Drawing Sheets

(56) References Cited

U.S. PATENT DOCUMENTS

| | | |
|---|---|---|
| 7,735,556 B2 | 6/2010 | Misselbrook et al. |
| 7,772,163 B1 | 8/2010 | Brannon et al. |
| 7,913,762 B2 | 3/2011 | Wheeler et al. |
| 7,971,643 B2 | 7/2011 | Brannon et al. |
| 8,418,762 B2 | 4/2013 | Casey et al. |
| 8,664,168 B2 | 3/2014 | Steiner |
| 8,899,332 B2 | 12/2014 | Brannon et al. |
| 9,010,430 B2 | 4/2015 | Darby et al. |
| 9,029,300 B2 | 5/2015 | Gupta |
| 9,102,860 B2 | 8/2015 | Cawiezel et al. |
| 9,168,565 B2 | 10/2015 | Vorderbruggen et al. |
| 9,328,590 B2 | 5/2016 | Vorderbruggen et al. |
| 2005/0194135 A1 | 9/2005 | Nguyen et al. |
| 2005/0194141 A1 | 9/2005 | Sinclair et al. |
| 2005/0288190 A1 | 12/2005 | Dao et al. |
| 2006/0003900 A1 | 1/2006 | Hanes |
| 2008/0078547 A1 | 4/2008 | Sinclair et al. |
| 2008/0182761 A1 | 7/2008 | Stephenson et al. |
| 2009/0149353 A1 | 6/2009 | Dajani et al. |
| 2009/0149354 A1 | 6/2009 | Dajani et al. |
| 2009/0205824 A1 | 8/2009 | Sullivan |
| 2009/0229821 A1* | 9/2009 | Misselbrook ........... E21B 43/26 166/281 |
| 2010/0147515 A1 | 6/2010 | Hughes et al. |
| 2010/0307749 A1 | 12/2010 | Nguyen et al. |
| 2011/0028354 A1 | 2/2011 | Le et al. |
| 2011/0146996 A1 | 6/2011 | Bell et al. |
| 2011/0220363 A1 | 9/2011 | Gupta et al. |
| 2012/0217012 A1 | 8/2012 | Darby |
| 2013/0126158 A1 | 5/2013 | Gupta et al. |
| 2015/0047848 A1 | 2/2015 | Bestaoui-Spurr et al. |
| 2015/0104647 A1 | 4/2015 | Bestaoui-Spurr |

OTHER PUBLICATIONS

"Technical Data Sheet SCP-2", Halliburton Company, Oct. 1960, 2 pgs.

"Technical Data Sheet SPC-2", Halliiburton Services, 2 pgs.

"SinterBall Bauxite"; MSDS' Mineracao Curimbaba Ltd..; Sep. 28, 1998, 4 pgs.

"LiteProp 125"; MSDS; Fritz Industries, Inc.; Jul. 17, 2008, 2 pgs.

* cited by examiner

METHOD FOR IMPROVING ISOLATION OF FLOW TO COMPLETED PERFORATED INTERVALS

This application is a continuation-in-part application of U.S. patent application Ser. No. 13/302,722, filed on Nov. 22, 2011, herein incorporated by reference. This application is also a continuation-in-part application of U.S. patent application Ser. No. 14/512,232 filed on Oct. 10, 2014 which is a continuation-in-part of U.S. patent application Ser. No. 14/461,123 filed on Aug. 15, 2014 which is a continuation-in-part application of U.S. patent application Ser. No. 13/928,006 filed on Jun. 26, 2013 which claims the benefit of U.S. provisional application Ser. No. 61/664,640 filed on Jun. 26, 2012, all of which are herein incorporated by reference.

FIELD OF THE DISCLOSURE

The present disclosure relates to an improved method for building a fluid-impermeable plug in a horizontal wellbore with a fluid pill containing a well treatment composite comprising a core of a dissolvable diverter and a deformable particulate and a viscosifying polymer and crosslinking agent coated onto at least a portion of the surface of the core.

BACKGROUND OF THE DISCLOSURE

Fracturing and acidizing are common stimulation methods for increasing the production of hydrocarbons from oil, gas and geothermal wells. The success of such stimulation operations depends on the production of hydrocarbons from high permeability zones as well as low permeability zones within a fracture network. In order to optimize the production of hydrocarbons from low permeability zones, chemical diverters have been used to divert the flow of fluid pills from higher permeability zones to lower permeability zones.

Typically, multiple fractures are required during a stimulation operation in order to reach economic production levels and provide effective drainage. When multiple fractures are required, the casing in a zone of interest, after being perforated and stimulated, must be hydraulically isolated before any new zone of interest can be exploited. Isolation of zones often consists of inserting a mechanical plug, hereinafter referred to as a bridge plug, below the zone of interest. The bridge plug hydraulically isolates that portion of the well from a lower portion (or the rest) of the well. The isolation of the lower zone ensures that high pressure fracturing fluid pumped into the well is directed to the zone of interest. The high pressure fracturing fluid is used to fracture the formation at the open perforations in the casing. The high pressure of the fracturing fluid initiates and then propagates a fracture through the formation.

Wirelines are typically used to run a bridge plug into a vertical well. This method, however, is not effective in horizontal wellbores since treatment fluids (necessary for efficient production of hydrocarbons) are displaced by the bridge plug. While coiled tubing may be used to push and set the bridge plug into a horizontal wellbore, the use of such tubing is time consuming and expensive.

Construction of a sand plug in a horizontal wellbore has further been explored in order to hydraulically isolate a zone from the lower portion of the wellbore. In order to build a sand plug, it is necessary that the end of the fracturing fluid include a pill of fluid containing a greater amount of sand or proppant in comparison to the amount of sand or proppant present in the fracturing fluid. An objective is to have the sand or proppant remain suspended in the fluid pill. The fluid pill is pumped into the well under the fracturing pump rate. The pumping, and thus displacement of the fracturing fluid, is stopped as the fluid pill reaches the perforation tunnels at the zone of interest. During this time, the fluid pill, with high concentration of sand, remains stationary within the wellbore as the fractures are allowed to partially close. Once the fractures are partially closed, displacement of the fluid pill is resumed, normally at a low rate in comparison to the pump rate during the fracturing process. Typically, the rate is set low enough to prevent the fractures from reopening. The fluid pill moves into the perforation tunnels and into the fractures. The high concentration of sand or proppant suspended within the fluid pill screens out against the fractures which are partially closed. Subsequently, the suspended sand in the fluid pill bridges off against the fractures. As the process continues, the sand continues to pack off against the perforation tunnels and eventually the sand packs off against itself creating a sand plug in the wellbore. The slow rate of pumping is continued until the pressure within the wellbore rises indicating that a proper sand plug has been built within the wellbore.

Constructing a sand plug within a horizontal wellbore is difficult since gravitational settling of sand or proppant in the wellbore causes the plug to settle along the bottom of the wellbore which creates a void or channel along the upper side of the wellbore. Isolation of the treated zone is compromised since the displacement fluid passes down the channel and into the fracture without allowing the sand plug to form. Thus, it is necessary in sand plug construction that the fluid pill remain stationary for a time sufficient to keep the sand or proppant suspended in order that fractures in the formation will at least partially close.

U.S. Pat. No. 7,735,556, herein incorporated by reference, discloses a method which remedies the problems associated with insufficient suspended sand or proppant prior to closing of fractures in the formation. This method uses an ultra lightweight (ULW) proppant or neutrally buoyant proppant, in combination with sand, to build a sand plug. The method facilitates multizone fracturing treatments in horizontal wellbores not seen with conventional sand isolation plugs and provides improved isolation between perforated intervals. In the method, a fluid pill containing the ULW proppant or neutrally buoyant proppant is pumped into the wellbore at the end of the fracturing treatment. The fluid pill is pumped down the wellbore until it almost reaches fractures within the zone of interest. The pumping is then ceased or reduced, allowing the fractures to partially close. The ULW proppant remains suspended within the fluid pill while stationary. The pumping is then resumed at a slow rate as a short pump burst. This causes the proppant in the fluid pill to bridge off until a bridge plug is formed.

Methods have been sought for enhancing the wellbore isolation capabilities while enhancing the recovery of hydrocarbons from low permeability zones of the formation.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment of the disclosure, a method for building a plug in a horizontal wellbore is provided. In this method, a fluid pill is pumped into the wellbore. The fluid pill contains a suspended well treatment composite. The well treatment composite has a core comprising a dissolvable diverter and a deformable particulate. A viscosifying polymer and crosslinking agent are coated onto the core. At least a portion of the dissolvable diverter disassociates from the core of the well treatment composite in-situ. The resulting "modified fluid pill" has less dissolvable diverter than the fluid pill initially pumped into the wellbore. At least a portion of a high permeability zone of the subterranean formation (penetrated by the wellbore) is blocked with the disassociated dissolvable diverter. The flow of the modified fluid pill is diverted away from the high permeability zone (now blocked by the diverter) to a low permeability zone of the formation. After at least one fracture in the lower permeability zone is at least partially closed, a fluid-impermeable plug containing the deformable particulates is formed by the in-situ reaction of the crosslinking agent (as it is disassociated from the deformable particulate) and the viscosifying polymer (as it is disassociated from the deformable particulate). The gelled fluid containing the deformable particulate forms a fluid-impermeable plug within the wellbore.

In another method for building a plug, a fracturing fluid is pumped into a horizontal wellbore at a pressure sufficient to create or enlarge a fracture in the subterranean formation penetrated by the wellbore. A fluid pill is then pumped into the wellbore. The fluid pill contains a suspended well treatment composite. The well treatment composite has a core comprising a dissolvable diverter and a deformable particulate. At least one viscosifying agent and at least one crosslinking agent are coated onto at least a portion of the surface of the core. A displacement fluid is pumped down the wellbore and displaces the fluid pill further into the wellbore in proximity to a perforation tunnel in a pre-determined location. At least a portion of the dissolvable diverter disassociates from the core to render a modified fluid pill containing less, if any, dissolvable diverter than the fluid pill originally pumped into the wellbore. The disassociated diverter blocks at least a portion of the higher permeability zone. The modified fluid pill is then directed to a lower permeability zone. At least one fracture within the horizontal wellbore is then at least partially closed. Displacement fluid may then be pumped into the horizontal wellbore to slowly displace the modified fluid pill into a zone of lower permeability. A thick gel is formed which creates a fluid-impermeable plug within the formation. The thickened gel is formed by the in-situ reaction of the crosslinking agent as it is disassociated from the core and the viscosifying polymer as it is disassociated from the core. The thickened gel contains the deformable particulate.

In an alternative method, a well treatment composite is used to form a plug within a horizontal wellbore. In this method, a fluid pill containing a well treatment composite is pumped to a location adjacent a zone of interest in the wellbore. The well treatment composite comprises a core of a dissolvable diverter and a deformable particulate as well as at least one viscosifying polymer and at least one crosslinking agent coated onto the core. The flow of the fluid pill is diverted to a low permeability portion of the formation. A modified fluid pill is formed after the dissolvable diverted disassociates from the core. The modified fluid pill contains less, if any, dissolvable diverter than the fluid pill originally pumped into the wellbore. The modified well treatment composite has a core comprising the deformable particulate. At least a portion of the surface of the deformable particulate is coated with the viscosifying polymer and the crosslinking agent. The pumping rate of the displacement fluid is varied and a fracture is created which extends from the zone of interest to partially close. The well treatment composite is suspended within the fluid pill. The viscosity of the modified fluid pill is increased to form a thickened gel by the in-situ reaction of the crosslinking agent as it is disassociated from the deformable particulate and the viscosifying polymer as it is disassociated from the deformable core. The zone of interest is plugged with the thickened gel containing the deformable particulate.

In another embodiment of building a plug in a horizontal wellbore, a well treatment composite is suspended within a fluid. The well treatment composite comprises a core of at least one dissolvable diverter and at least one ULW particulate. At least one viscosifying polymer and at least one crosslinking agent are coated onto the core. The flow of the fluid pill is diverted to a low permeability portion of the formation. A modified fluid pill is formed after the dissolvable diverter dissolves. The modified well treatment composite has a core comprising the deformable particulate. At least a portion of the surface of the deformable particulate is coated with the viscosifying polymer and the crosslinking agent. The modified fluid pill is then displaced and at least one fracture in a zone of the horizontal wellbore then partially closes. The modified fluid pill continues to be displaced after the fracture in the zone has partially closed. A gelled fluid containing the ULW deformable core bridges off forming a plug within the wellbore. During displacement of the modified fluid pill, the thickened gel is formed by the in-situ reaction of the crosslinking agent (after it is disassociated from the ULW deformable particulate) and the viscosifying polymer (after it is disassociated from the ULW deformable particulate).

When used in stimulation, the deformable core particulate in the alternative embodiments of the disclosure has a larger diameter than the diameter of the proppant. The larger diameter of the deformable core of the particulate promotes the bridging of the deformable particulate in the fracture.

The use of the well treatment composite described herein renders it unnecessary to separately ship the deformable particulate, diverting agent, viscosifying agent, crosslinking agent and other well treatment additives to a remote location. In addition, less surface operating area is needed on site to perform the well treatment operation since less space is needed for formulating the fluid pill. Further, use of the well treatment composite may save time on the fly by reducing the waiting time normally encountered for fracture closure, settling of a sand plug and forming a sufficient seal.

On the surface, the fluid pill is prepared by simply adding the well treatment composite to the base fluid to form the fluid pill. The base fluid of the fluid pill may be salt water, fresh water or slickwater.

Characteristics and advantages of the present disclosure described above and additional features and benefits will be readily apparent to those skilled in the art upon consideration of the following detailed description of various embodiments and referring to the accompanying drawing.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
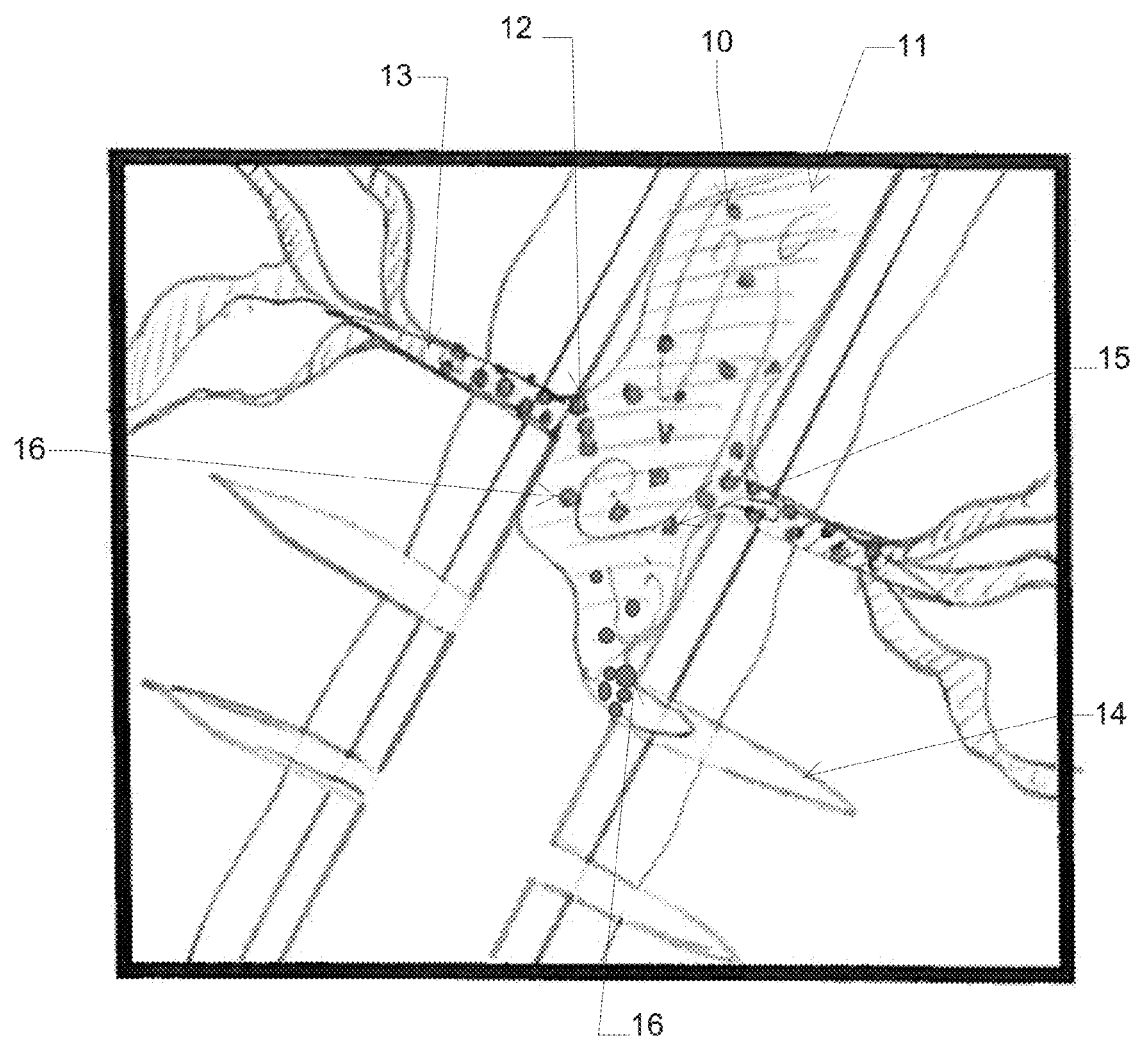
FIGS. 1 and 2 depict the building of a fluid-impermeable plug in a low permeability zone of a subterranean formation by packing a high permeability zone with a dissolvable diverter after the diverter has disassociated from the core of the well treatment composite disclosed herein.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. Also, the terms "including" and "comprising" are used herein and in the appended claims in an open-ended fashion, and thus should be interpreted to mean "including, but not limited to . . . ."

Illustrative embodiments and methods of the present disclosure are described below as they might be employed in the use of the well treatment composite to build a sand plug in a horizontal wellbore. In the interest of clarity, not all features of an actual implementation are described in this specification. It will of course be appreciated that in the development of any such actual embodiment or method, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments of the disclosure will become apparent from consideration of the following description.

A fluid-impermeable plug is formed in accordance with the method described herein. The term "fluid-impermeable plug" shall refer to a plug which isolates, substantially impairs or prevents the flow of well treating fluids to locations where flow of fluids is not desirable, such as previously stimulated intervals.

A horizontal well, as used herein, refers to any deviated well. These wells can include, for example, any well which deviates from a true vertical axis more than 60 degrees. Those ordinarily skilled in the art having the benefit of this disclosure will understand that all such wells are encompassed by the term "horizontal well."

The fluid-impermeable plug which results from the method described herein hydraulically isolates at least a portion of the horizontal wellbore.

According to an exemplary embodiment of the present disclosure, after the casing has been perforated, fracturing fluid containing a proppant is pumped down the casing under high pressure creating fractures in the well formation at the perforations in the casing. After the fractures are created in the formation, proppant located in the fracturing fluid enters the fractures and holds the fractures open. The proppant and the fracturing fluid may be any known in the art to be effective in creating or enlarging fractures.

After the primary fracture is created or enlarged, the fluid pill containing the well treatment composite may be pumped into the formation. The well treatment composite has a core having a deformable particulate and a dissolvable diverter. At least a portion of the surface of the core is coated with at least one viscosifying polymer and at least one crosslinking agent. The fluid pill may be pumped directly to the high permeability zone of the well formation.

The dissolvable diverter may disassociate from the core as it is dissolved in reservoir fluids as well as the fluid of the fluid pill. Once the dissolvable diverter disassociates from the core of the well treatment composite, the disassociated diverter blocks at least a portion of a high permeability zone of the formation and the remaining fluid containing less (or no) dissolvable diverter is diverted into a lower permeability zone (the remaining fluid may hereinafter be called the "modified fluid pill").

The deformable particulate typically is selected to have a larger diameter than the diameter of the proppant used in the fracturing fluid. The larger diameter of the deformable particulate further prevents the entrance of the thickened gel into the fractures. This, in turn, promotes the thickened gel containing the deformable particulates to bridge off against itself. Preferably the median diameter of the deformable particulate of the well treated composite is about two times the median diameter of the proppant used in the fracturing treatment.

The process disclosed herein may be repeated one or more times such that multiple fluid pills containing a well treatment composite having a core of deformable particulate and dissolvable diverter are pumped into the formation to divert the flow of the fluid pill into lower permeability zones. In this manner, plugs to lower permeability zones may be created.

The fluid pill, typically pumped into the horizontal wellbore at the tail end of the fracturing treatment, contains the well treatment composite in a base fluid. The fluid of the fluid pill is one which is suitable for transporting the particulates into the reservoir and/or subterranean formation.

The base fluid is typically water, brine (including completion brines) or slickwater. Suitable brines including those containing potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate, and mixtures thereof. The percentage of salt in the water preferably ranges from 0% to about 60% by weight, based upon the weight of the water.

The fluid of the fluid pill may further be foamed with a liquid hydrocarbon or a gas or liquefied gas such as nitrogen or carbon dioxide. In addition, the fluid may further be foamed by inclusion of a non-gaseous foaming agent. The non-gaseous foaming agent may be amphoteric, cationic or anionic. Suitable amphoteric foaming agents include alkyl betaines, alkyl sultaines and alkyl carboxylates, such as those disclosed in U.S. Patent Publication No. 2010/0204069, herein incorporated by reference. Suitable anionic foaming agents include alkyl ether sulfates, ethoxylated ether sulfates, phosphate esters, alkyl ether phosphates, ethoxylated alcohol phosphate esters, alkyl sulfates and alpha olefin sulfonates. Suitable cationic foaming agents include alkyl quaternary ammonium salts, alkyl benzyl quaternary ammonium salts and alkyl amido amine quaternary ammonium salts.

The pH of the fluid pill containing the well treatment composite may further be adjusted when desired. When adjusted, the fluid pill typically has a value of about 6.5 or more, 7 or more, 8 or more, 9 or more, between 9 and 14, and, most preferably, between 7.5 and 9.5. The pH may be adjusted by any means known in the art, including adding acid or base to the fluid, or bubbling carbon dioxide through the fluid.

The fluid may be gelled or non-gelled. Typically the fluid pill is gelled by the inclusion of a viscosifying agent such as a viscosifying polymer or viscoelastic fluid. The fluid pill may contain a crosslinking agent though a crosslinking agent is not required. Generally the viscosity of the fluid is greater than or equal to 10 cP at room temperature.

The size distribution of the dissolvable diverter should be sufficient to block the penetration of the fluid into the high permeability zone of the formation. A filter cake is more easily formed when at least 60%, more preferably 80%, of the diverter particulates within the fluid pill have a particle size between from about 150 μm to about 2000 μm.

Typically, the amount of dissolvable diverter in the fluid pill is between from about 0.01 to about 30 weight percent and the amount of deformable particulate in the fluid pill is between from about 0.01 to about 3% by weight.

The concentration of the deformable core in the well treatment composite is generally higher than the amount of proppant in the fracturing fluid during the fracturing process.

Suitable dissolvable diverters include phthalic anhydride, terephthalic anhydride, phthalic acid, terephthalic acid, gilsonite, rock salt, benzoic acid flakes, polylactic acid and mixtures thereof.

Other suitable diverters include unimodal or multimodal polymeric mixtures of ethylene or other suitable, linear or linear, branched alkene plastics, such as isoprene, propylene, and the like. Such polymeric mixtures may be described as ball sealers set forth in U.S. Pat. No. 7,647,964, herein incorporated by reference.

Such ethylene polymeric mixtures typically comprise ethylene and one or more co-monomers selected from the group consisting of alpha-olefins having up to 12 carbon atoms, which in the case of ethylene polymeric mixtures means that the co-monomer or co-monomers are chosen from alpha-olefins having from 3 to 12 carbon atoms (i.e., $C_3$-$C_{12}$), including those alpha-olefins having 3 carbon atoms, 4 carbon atoms, 5 carbon atoms, 6 carbon atoms, 7 carbon atoms, 8 carbon atoms, 9 carbon atoms, 10 carbon atoms, 11, carbon atoms, or 12 carbon atoms. Alpha-olefins suitable for use as co-monomers with ethylene in accordance with the present invention can be substituted or un-substituted linear, cyclic or branched alpha.-olefins. Preferred co-monomers suitable for use with the present invention include but are not limited to 1-propene, 1-butene, 4-methyl-1-pentene, 1-pentene, 1-hexene, 1-octene, 1-decene, 1-dodecene, and styrene.

Typical ethylene polymeric mixtures which comprise the ball sealers of the present invention include ethylene-octene polymeric mixtures, ethylene-butene mixtures, ethylene-styrene mixtures, and ethylene-pentene mixtures. More typically, the deformable ball sealers comprise ethylene-octene, ethylene-butene, and ethylene-pentene polymeric mixtures. A particular ethylene-octene copolymer component of the deformable ball sealer composition of the present invention is a substantially linear elastic olefin polymer.

The ethylene-α-olefin polymers useful herein may include linear copolymers, branched copolymers, block copolymers, A-B-A triblock copolymers, A-B diblock copolymers, A-B-A-B-A-B multiblock copolymers, and radial block copolymers, and grafted versions thereof, as well as homopolymers, copolymers, and terpolymers of ethylene and one or more alpha-olefins. Examples of useful compatible polymers include block copolymers having the general configuration A-B-A, having styrene endblocks and ethylene-butadiene or ethylene-butene midblocks, linear styrene-isoprene-styrene polymers, radial styrene-butadiene-styrene polymers and linear styrene-butadiene-styrene polymers.

Other polymers and copolymers include water soluble ball sealers composed of collagen, commonly referred to as biosealers.

Preferred diverting agents for use in the disclosure include those of structural formula (III):

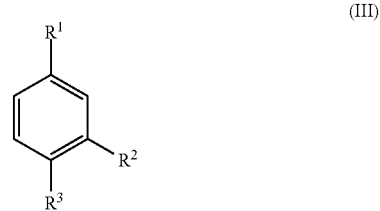

wherein:
$R^1$ is —COO—$(R^5O)_y$—$R^4$ or —H;
$R^2$ and $R^3$ are selected from the group consisting of —H and —COO—$(R^5O)_y$—$R^4$;
  provided both $R^2$ or $R^3$ are —COO—$(R^5O)_y$—$R^4$ when $R^1$ is —H and
  further provided only one of $R^2$ or $R^3$ is —COO—$(R^5O)_y$—$R^4$ when $R^1$ is —COO—$(R^5O)_y$—$R^4$;
$R^4$ is —H or a $C_1$-$C_6$ alkyl group;
$R^5$ is a $C_1$-$C_6$ alkylene group; and
each y is 0 to 5.

Alternatively, the particulates may be an anhydride of the compound of structural formula (III).

In a preferred embodiment, $R^2$ of the compound of formula (III) is —H and $R^3$ is —COO—$(R^5O)_y$—$R^4$. In an especially preferred embodiment, the compound of formula (III) is phthalic acid (wherein y is 0 and $R^1$ and $R^4$ are —H). In another preferred embodiment, the compound of formula (III) is phthalic acid anhydride.

Still in another preferred embodiment, $R^2$ of the compound of formula (III) is —COO—$(R^5O)_y$—$R^4$ and $R^3$ is —H. In an especially preferred embodiment, the compound of formula (III) is terephthalic acid (wherein y is 0 and $R^2$ and $R^4$ are —H). In another preferred embodiment, the compound of formula (III) is terephthalic acid anhydride.

Other diverters include those aliphatic polyesters having the general formula of repeating units illustrated in structural formula (I) below:

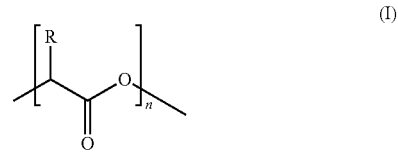

where n is an integer between 75 and 10,000 and R is selected from the group consisting of hydrogen, alkyl (preferably a $C_1$-$C_6$ alkyl), aryl (preferably a $C_6$-$C_{18}$ aryl), alkylaryl (preferably having from about 7 to about 24 carbon atoms), acetyl, heteroatoms (such as oxygen and sulfur) and mixtures thereof. In a preferred embodiment, the weight average molecular weight of the aliphatic polyester is between from about 100,000 to about 200,000.

Typically, the downhole temperature of the wellbore is between from about 80° F. to about 400° F. The dissolvable diverter particulates are capable of diverting the fluid pill from a high permeability zone to a low permeability zone of a subterranean formation at such bottomhole temperatures.

Since conductivity is permeability multiplied by injection geometry, this is synonymous to the statement that the particulates are capable of diverting a fluid pill from a highly conductive primary fracture(s) to less conductive secondary fractures. Further, since conductivity is a function of the relative resistance to inflow, the reference to a conductive fracture as used herein is considered synonymous to a conductive reservoir area.

In those instances, where the bottomhole temperature within the well is less than 250° F., a mixture of the dissolvable particulates of formula (III) and formula (I) have been found to be desirable. In such cases, the weight ratio of particulates of formula (I) and particulates of formula (III) introduced into the well is typically between from about 95:5 to about 5:95 and more typically between from about 40:60 to about 60:40. Typically, the amount of diverter particulates (in the mixture) within the fluid introduced into the well is between from about 0.01 to about 30 weight percent (based on the total weight of the fluid) and the amount of the compound(s) of formula (III) in the fluid is from about 0.01 to about 3% by weight.

A preferred aliphatic polyester is poly(lactide). Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to formula (I) without any limitation as to how the polymer was made such as from lactides, lactic acid, or oligomers, and without reference to the degree of polymerization.

The lactide monomer exists generally in three different forms: two stereoisomers L- and D-lactide and racemic D,L-lactide (meso-lactide). The oligomers of lactic acid, and oligomers of lactide may be defined by the formula:

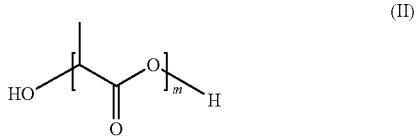

(II)

where m is an integer: $2 \leq m \leq 75$. Preferably m is an integer: $2 \leq m \leq 10$. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semi-crystalline polymer with a relatively slow hydrolysis rate. Poly(D,L-lactide) may be a more amorphous polymer with a resultant faster hydrolysis rate. The stereoisomers of lactic acid may be used individually or combined. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers may be modified by blending high and low molecular weight polylactide or by blending polylactide with other polyesters.

As an alternative to the aliphatic polyesters of formula (I), the phthalic acid or phthalic acid anhydride of formula (III) may be used to enhance the activity of other aliphatic polyesters including star- and hyper-branched aliphatic polyesters polymers as well as other homopolymers, random, block and graft copolymers. Such suitable polymers may be prepared by polycondensation reactions, ring-opening polymerizations, free radical polymerizations, anionic polymerizations, carbocationic polymerizations, and coordinative ring-opening polymerization for, e.g., lactones, and any other suitable process. Specific examples of suitable polymers include polysaccharides such as dextran or cellulose; chitin; chitosan; proteins; orthoesters; poly(glycolide); poly(ε-caprolactone); poly(hydroxybutyrate); poly(anhydrides); aliphatic polycarbonates; poly(orthoesters); poly (amino acids); poly(ethylene oxide); and polyphosphazenes.

The dissolvable diverter typically has a sized particle distribution effective to block the penetration of the fluid into the high permeability zone of the formation once disassociated from the core. Typically, the particle size distribution of the diverter is in the range from about 0.1 micron to about 1.0 millimeter.

The dissolvable diverter may be of any shape. For instance, the dissolvable diverter may be substantially spherical, such as being beaded, or pelleted. Further, the diverter may be non-beaded and non-spherical such as an elongated, tapered, egg, tear-drop or oval shape or mixtures thereof. For instance, the diverter may have a shape that is cubic, bar-shaped (as in a hexahedron with a length greater than its width, and a width greater than its thickness), cylindrical, multi-faceted, irregular, or mixtures thereof. In addition, the diverter may have a surface that is substantially roughened or irregular in nature or a surface that is substantially smooth in nature.

The dissolvable diverter may be partially, but not fully, dissolved at in-situ reservoir conditions. Typically, the diverter is fully dissolved over time at bottomhole temperatures.

The deformable particulates may be non-porous or porous. Preferred are porous deformable particulates. The deformable particulates substantially yield upon application of a minimum threshold level to point to point stress at in situ conditions and do not shatter or break at elevated downhole stresses. The deformable particulates may therefore be selected to function in low to moderate stress environments (100 psi to 5,000 psi) as well as moderate to high stress environments (5,000 psi to 15,000 psi). The diameter of the deformable particulate is preferably greater than the diameter of a proppant used during fracturing of the wellbore.

Preferred deformable particulates include ultra lightweight (ULW) particulates having an apparent specific gravity (ASG) (API RP 60) less than 2.45. Preferred are those ULW particulates having an ASG less than or equal to 2.25, preferably less than or equal to 2.0, more preferably less than or equal to 1.75, even more preferably less than or equal to 1.5, most preferably less than or equal to 1.25.

Suitable deformable particulates include naturally occurring materials, such as (a.) chipped, ground or crushed shells of nuts such as walnut, pecan, coconut, almond, ivory nut, brazil nut, etc.; (b.) chipped, ground or crushed seed shells (including fruit pits) of seeds of fruits such as plum, olive, peach, cherry, apricot, etc.; (c.) chipped, ground or crushed seed shells of other plants such as maize (e.g., corn cobs or corn kernels), etc.; and (d.) processed wood materials such as those derived from woods such as oak, hickory, walnut, poplar, mahogany, etc.

An optional protective or hardened material on the deformable particulates may act to harden and/or isolate or protect the deformable particulates from adverse formation or wellbore conditions. The protective or hardened material may coat the deformable particulates entirely or may coat only a portion of the deformable particulate. The protective or hardened material layer may protect the deformable particulate from exposure to acids or workover/drilling fluids, to avoid saturation with liquids, etc. In this regard, any coating material suitable for at least partially protecting or isolating the deformable particulate may be employed. Examples of such hardening and/or protective materials include, but are not limited to resins like urethanes, phenol formaldehyde resins, melamine formaldehyde resins and urethane resins, low volatile urethane resins), etc. and mixtures thereof.

Methods acceptable for the coating of deformable particulates are known in the art. For example, low temperature curing methods may be employed (e.g., using fast setting "cold set" or "cold cure" resins), where heating may be a problem, such as when coating materials which may be sensitive to heat, like ground nuts or fruit pits. Alternatively, indirect heating processes may be employed with such materials when it is necessary to heat a coating material for cure. Low temperature curing resins may be applied with little or no heat, which may be desirable when coating heat-sensitive materials such as wood, nut shell material, etc. Alternatively, heat cured resins may be applied and cured using heating methods that are compatible with heat sensitive materials.

Deformable particulates may further include such copolymers as polystyrene divinylbenzene terpolymers (including polystyrene/vinyl/divinyl benzene) and acrylate-based terpolymers, and polymers of furfuryl derivatives, phenol formaldehyde, phenolic epoxy resins, polystyrene, methyl methacrylate, nylon, polycarbonates, polyethylene, polypropylene, polyvinylchloride, polyacrylonitrile-butadiene-styrene, polyurethane and mixtures thereof.

The deformable particulate may further be a multitude of well treatment aggregates agglomerated, bonded or fused together. Included are well treating aggregates composed of deformable organic lightweight material and a weight modifying agent. The ASG of the organic lightweight material is either greater than or less than the ASG of the well treating aggregate depending on if the weight modifying agent is a weighting agent or weight reducing agent, respectively. Exemplary of preferred deformable particulates are those set forth in U.S. Pat. No. 7,322,411, herein incorporated by reference. The ASG of the well treating aggregate is generally less than or equal to 2.0, preferably less than or equal to 1.5.

The ASG of the deformable particulate may be varied according to the fluid used in the fluid pill to ensure that the deformable particulates do not settle out of the fluid pill while it is stationary within the wellbore.

Such deformable particulates for use herein are preferably neutrally buoyant in the fluid pill.

Typically, the neutrally buoyant well treatment composite is suspended within the fluid pill as the fluid pill is pumped down the wellbore. The use of the neutrally buoyant well treatment composite may allow the fluid pill to be pumped down coiled tubing and placed at a desired location within a wellbore. The stability of the well treatment composite and neutrally buoyant deformable particulate allows a fluid pill suspending the well treatment composite to be pumped through coiled tubing and into the wellbore without the risk that the deformable particulate will settle out. Once the fluid pill is within the wellbore, the fluid pill may be slowly displaced into the zone of interest as the thickened gel is formed, causing the thickened gel to bridge off and form a plug within the wellbore. The viscosifying agent coated onto the core is crosslinkable and may include anionic and nonionic polysaccharides, polyvinyl alcohols, polyacrylates, polyacrylamides and mixtures thereof.

Exemplary of such viscosifying agents are carboxyalkyl cellulose and carboxyalkylhydroxyalkyl cellulose derivatives such as carboxyethylcellulose, carboxymethylcellulose and carboxymethylhydroxyethyl cellulose. Also included are galactomannan gums, such as include non-derivatized guar and derivatized guars like hydroxyalkyl guar and carboxyalkylhydroxyalkyl guar, we well as microbial polysaccharides include xanthan, succinoglycan and scleroglucan. Preferred amongst this group are hydroxypropyl guar and carboxymethylhydroxypropyl guar.

Other suitable viscosifying agents are welan and homo-, block or random polymers containing vinyl alcohol, acrylate, pyrrolidone, 2-acrylamido-2-methylpropane sulfonate, or acrylamide units.

Generally, the amount of viscosifying agent coated onto the core is between from about 0.1 to about 5 wt %, preferably about 0.5 to about 4 weight %, based on the total weight of core and viscosifying agent.

Suitable crosslinking agents coated onto the core include borate ion releasing compounds, organometallic or organic complexed metal ions comprising at least one transition metal or alkaline earth metal ion as well as mixtures thereof. Where the viscosifying agent is guar or hydroxypropyl guar, a borate ion releasing crosslinking agent is preferred.

Typically, the amount of crosslinking agent coated onto the core is between from about 0.001 percent to about 2 percent, preferably from about 0.005 percent to about 1.5 percent, and, most preferably, from about 0.01 percent to about 1.0 percent, based on the total weight of the core, viscosifying agent and crosslinking agent.

Borate ion releasing compounds which can be employed include, for example, any boron compound which will supply borate ions in the fluid upon disassociation from the deformable particulates. Such compounds include boric acid, alkali metal borates such as sodium diborate, potassium tetraborate, sodium tetraborate (borax), pentaborates and the like and alkaline and zinc metal borates. Such borate ion releasing compounds are disclosed in U.S. Pat. No. 3,058,909 and U.S. Pat. No. 3,974,077 herein incorporated by reference. In addition, such borate ion releasing compounds include boric oxide (such as selected from $H_3BO_3$ and $B_2O_3$) and polymeric borate compounds. Mixtures of any of the referenced borate ion releasing compounds may further be employed. Such borate-releasers typically require a basic pH (e.g., 8.0 to 12) for crosslinking to occur.

Further preferred crosslinking agents are those, such as organometallic and organic complexed metal compounds, which can supply trivalent or higher polyvalent metal ions into the fluid upon their disassociation from the deformable particulates. Examples of the trivalent or higher polyvalent metal ions include boron, titanium, zirconium, aluminum, yttrium, cerium, etc. or a mixture thereof. Examples of titanium compounds include titanium ammonium lactate, titanium triethanolamine, titanium acetylacetonate, titanium diisopropoxide bisacetyl aminate, titanium tetra(2-ethyl hexoxide), titanium tetraisopropoxide, titanium di(n-butoxy) bistriethanol aminate, titanium isopropoxyoctylene glycolate, titanium diisopropoxy bistriethanol aminate and titanium chloride. Examples of zirconium salts include zirconium ammonium carbonate, zirconium carbonate, zirconium acetylacetonate, zirconium diisopropylamine lactate, zirconium chloride, zirconium lactate, zirconium lactate triethanolamine, zirconium oxyacetate, zirconium acetate, zirconium oxynitrate, zirconium sulfate, tetrabutoxyzirconium (butyl zirconate), zirconium mono(acetylacetonate), zirconium n-butyrate and zirconium n-propylate. The crosslinking agent may optionally be encapsulated.

Examples of typical crosslinking agents include, but are not limited to, those described in U.S. Pat. No. 4,514,309 and U.S. Pat. No. 5,247,995, which are incorporated herein by reference.

In addition, a crosslinking or viscosification delaying agent may be coated onto the core in order to control, along with the crosslinking agent, viscosification of the fluid. Suitable delayed viscosification agents include salts, such as potassium chloride, sodium chloride and calcium chloride. Further suitable crosslinking or viscosification delaying agents include organic polyols, such as sodium gluconate; sodium glucoheptonate, sorbitol, mannitol, phosphonates, bicarbonate salt, salts, various inorganic and weak organic acids including aminocarboxylic acids and their salts (EDTA, DTPA, etc.) and citric acid and mixtures thereof. Such delaying agents are capable of delaying viscosification to the gel until the downhole temperature is reached which causes the reaction between the viscosifying agent and crosslinking agent. At that point, substantial viscosification of the well treatment composition results.

When present, the amount of crosslinking delaying agent typically coated onto the core is between from about 0.001 percent to about 2 percent based on the total weight of the core and viscosifying agent.

Other additives may also be coated and hardened onto the core. For instance, a base to assist in stabilization of crosslinking may also be hardened onto the core. Suitable stabilizers include those conventionally employed in the art, such as an encapsulated base or in-situ base fluids. Exemplary stabilizers may include, but are not limited, to alkali halides, ammonium halides, potassium fluoride, dibasic alkali phosphates, tribasic alkali phosphates, ammonium fluoride, tribasic ammonium phosphates, dibasic ammonium phosphates, ammonium bifluoride, sodium fluoride, triethanolamine, alkali silicates and alkali carbonates.

Buffering agents may also be adhered to the core in order to maintain the desired pH of the fluid since, in some instances, when the pH of the fluid is too low, degradation of the viscosifying agent may occur. Typical examples of buffering agents include, but are not limited to: sodium phosphate, sodium hydrogen phosphate, boric acid-sodium hydroxide, citric acid-sodium hydroxide, boric acid-borax, sodium bicarbonate, ammonium salts, sodium salts like sodium chloride, potassium salts like potassium chloride, dibasic phosphate, tribasic phosphate, lime, slaked lime, magnesium oxide, magnesium chloride, calcium chloride, basic magnesium carbonate, calcium oxide and zinc oxide.

Buffering agents may also be used to manage pH. For instance, when crosslinking agents are employed, such as borate crosslinking agents, a buffering agent may be used to facilitate the triggering of the crosslinking agent at a pH of 9.0 or higher.

Similarly, biocides, surfactants and corrosion inhibitors designed to prevent emulsion with formation fluids, to reduce surface tension, to enhance load recovery may be hardened onto the core. Further, one or more treatment additives used to control fines or clay swelling or migration such as clay substitutes of the type based on tetramethylammonium chloride, or potassium chloride or polycationic clay control additives, may be hardened onto the core.

Further, a breaker may optionally be coated onto the core. For instance, a breaker capable of delayed reduction of the viscosity of the gelled fluid in-situ, may further be coated onto the core. Such breakers allow the fluid to be easily and effectively removed from the formation and to allow desired material, such as oil or gas, to flow into the wellbore. Such breakers include mild oxidizing agents such as persulfates, percarbonates, perborates, peroxides, perphosphates, permanganates, etc. such as alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate. Additional suitable breaking agents are disclosed in U.S. Pat. Nos. 5,877,127; 5,649,596; 5,669,447; 5,624,886; 5,106,5 6,162,766; and 5,807,812. In addition, enzymatic breakers may also be used. Examples of suitable enzymatic breakers such as guar specific enzymes, alpha and beta amylases, amyloglucosidase, oligoglucosidase, invertase, maltase, cellulase, and hemi-cellulase are disclosed in U.S. Pat. Nos. 5,806,597 and 5,067,566.

When present, the amount of additives referenced above which may be coated onto the core is no greater than from about 0.001 percent to about 2 percent based on the total weight of the core and viscosifying agent.

The crosslinking agent and viscosifying agent, as well as other components desired to be coated onto the mixture of deformable particulate(s) and dissolvable diverter(s) comprising the core, may be deposited onto the core by being sprayed onto the core and then drying the coated core at a temperature above the boiling point of the coated material(s) but below the decomposition temperature of the viscosifying agent. The crosslinking agent, viscosifying agent and other additives, if any, typically disassociate from the deformable particulates in reverse order to the manner in which they were coated onto the core.

Preferably, coating of the core occurs in a fluidized bed where conditions may be attained to drive off water and other volatile liquids. The dissolvable diverter and the deformable particulates are placed in the bottom of the bed which is perforated and which contains an entry port for the introduction of air or gas. As air or gas is introduced into the bed, the crosslinking agent, viscosifying agent and other materials which are desired to be deposited onto the core are introduced, preferably simultaneously, or injected into the bed through different orifices. The core is then coated with coating materials as the dissolvable diverter and the deformable particulates move from the bottom of the bed and through the perforations. The coated cores are then dried at a temperature between from about 120° F. to about 150° F. while air or gas is blown into the bed in a dehumidified state.

Alternatively, the dissolvable diverter and deformable particulates may be slurried with the crosslinking agent and viscosifying agent, along with other materials desired to be deposited onto the core, at ambient temperature and pressure. The slurry may then be subjected to an aqueous spray tower to remove the liquids.

In addition to the well treatment composite described herein, the fluid pill may contain one or more conventional proppants, such as sand like Ottawa Sand, bauxite and ceramics. In addition, conventional proppants lighter than sand may also be used.

Such a mixture may contain, for example, approximately 30% well treatment composite and approximately 70% proppant (such as, for example, Ottawa Sand) by total plug weight (owing to density differences this yields an approximate 50/50 mix by volume). An alternative exemplary embodiment could use a 15/85 mixture of well treatment composite and conventional proppant by weight.

Prior to disassociating the dissolvable diverter from the core of the well treatment composite, the fluid pill may be displaced further into the horizontal wellbore by pumping a displacement fluid down the wellbore. The fluid pill is thereby displaced in proximity to a perforation tunnel. A pressure increase results as displacement fluid continues to be pumped into the wellbore.

A displacement fluid may further be used after the dissolvable diverter has bridged a more permeable fracture but prior to formation of the plug. Typically, the displacement fluid enhances the viscosity or stiffness of the crosslinked gel. The stiffness of the gelled fluid prevents or substantially limits the flow of any subsequently pumped fluids into the completed perforated interval.

In an embodiment, the pumping of the displacement fluid may be varied based upon whether the fluid pill is comprised only of the well treatment composite or is comprised of a combination of the well treatment composite and conventional proppants. When the fluid pill is comprised of only the well treatment composite, the pumping of displacement fluid is typically resumed at a low rate to slowly displace the fluid pill down the casing. The pumping rate of the displacement fluid should be low enough to prevent the fractures from reopening and should be at a rate lower than the pumping rate used during the fracturing process.

In another embodiment, the well treatment composite may be suspended in the fluid pill while the fluid pill is stationary within the horizontal wellbore. Pumping of the fluid pill may then be resumed down the horizontal wellbore at a very slow rate or via a short pumping burst to displace the fluid pill after the fluid pill has been stationary. This prevents the well treatment composite from entering the fracture wherein the thickened gel containing the ULW deformable core bridges off against the wellbore and forms a plug.

In another embodiment, once the fluid pill has been pumped downhole, the pumping rate of the fluid is reduced to a lower pumping rate, instead of completely stopping the pumping rate. This reduction is for a period of time sufficient enough to allow the fracture at the zone of interest to partially close by the time the fluid pill reaches the zone of interest. Upon reaching the zone of interest, the thickened gel (formed from the reaction of viscosifying polymer and crosslinking agent) is slowly displaced into the zone of interest causing the gel to bridge off and form a plug within the wellbore.

The pumping rate can be adjusted based on the size of the casing, the length of the horizontal well and the size of the fluid pill in order to limit the amount of well treatment composite and/or conventional proppant that is dropped out of the fluid pill during placement. Those skilled in the art having the benefit of this disclosure realize there are any variety of computer models and methods by which this adjustment may be accomplished.

Where the fluid pill is comprised of the well treatment composite and a conventional proppant, the pumping of displacement fluid may be resumed as a short pumping burst. This pumping burst rate, for example, may be the pumping rate used during fracturing operations. This short pump burst involves bringing the pump rate up from zero to substantially the fracturing rate as quickly as possible for a short duration. Once this is done, a rapid increase in pressure will be observed at the surface if the fluid pill bridges off against the fracture. If no pressure increase is observed, then the fracture has not been plugged and the short pumping burst is repeated. A pressure increase may be indicative that the wellbore has been hydraulically isolated with the plug. However, once a sufficient pressure increase is observed, the fracture will have been plugged.

In an embodiment, the displacement fluid is the same fluid as the base fluid of the fluid pill. In other instances, the displacement fluid may contain a linear gel in an amount less than or equal to 10 pptg. When using a linear gel in the displacement fluid, the time for settling of the plug may be decreased.

FIG. 1 illustrates the blocking of a high permeability zone of the formation by a disassociated dissolvable diverter. Fluid pill 10 containing a well treatment composite is pumped through a channel into perforation tunnel 11. After the fluid pill is pumped into the channel, the fluid pill may be displaced into the channel by pumping of a displacement fluid down the wellbore. The fluid pill may then be moved such that it is in proximity to tunnel 11 within the channel.

The well treatment composite consists of a core of dissolvable diverter and deformable particulates and one or more crosslinking agents and one or more viscosifying agents coated onto at least a portion of the surface of the core. The dissolvable diverter 12 disassociates from the well treatment composite. The size of the dissolvable diverter is such that it may flow into the fracture of higher permeability zone 13 and thereby pack and temporarily bridge the fracture. Such temporary bridges cause a pressure increase and the disassociation of the dissolvable diverter from the core enables modified fluid pill 15 to flow to lower permeability zone 14, typically deeper into the subterranean formation. Permeability of higher permeability zone 13 is reduced by the packing of the fracture.

The well may be shut-in for a time sufficient to allow the fractures in the formation to at least partially close to ensure bridging.

The fluid pill has now been modified such that the composite of modified fluid pill 15 is identical to the well treatment composite of fluid pill 10 except that it contains less dissolvable diverter (at least a portion of the dissolvable diverter of the composite of fluid pill 10 now temporarily bridging higher permeability zone 13). In some cases, the modified core of the composite of modified fluid pill 15 contains no dissolvable diverter.

The solid particulates of dissolvable diverter 12 typically bridge the flow spaces of fractures on the face of the formation and form a filter cake. The pressure drop though the filter cake increases the flow resistance and diverts modified fluid pill to the less permeable zones of the formation.

Modified fluid pill 15 flows into or near the vicinity of the fracture in lower permeability zone 13. A thickened gel is formed from the reaction of the viscosifying polymer and crosslinking agent. Since the fractures are already partially closed and full of proppant from the fracturing process, the thickened gel containing deformable particulates 16 is at least partially prevented from entering the fractures. A plug is formed from the thickened gel.

In addition to forming a plug from modified fluid pill 15, additional fluid pill 10 may be pumped into tunnel 11. Since the fracture in higher permeability zone has already been temporarily bridged by dissolvable diverter, the additional fluid pill flows into other productive zones within the formation. This process may be repeated as more lower permeability zones are plugged.

Over a period of time, the diverters bridging the fractures dissolve. Those fractures may remain open due to the presence of the proppant or deformable particulates within the fracture. Prior to complete closure or collapse of the fracture, the fracture may be plugged by pumping into tunnel 11 a fluid pill containing a composite of the deformable particulate (but not the dissolvable diverter) and the crosslinking agent and viscosifying agent as described above.

Figure 2:
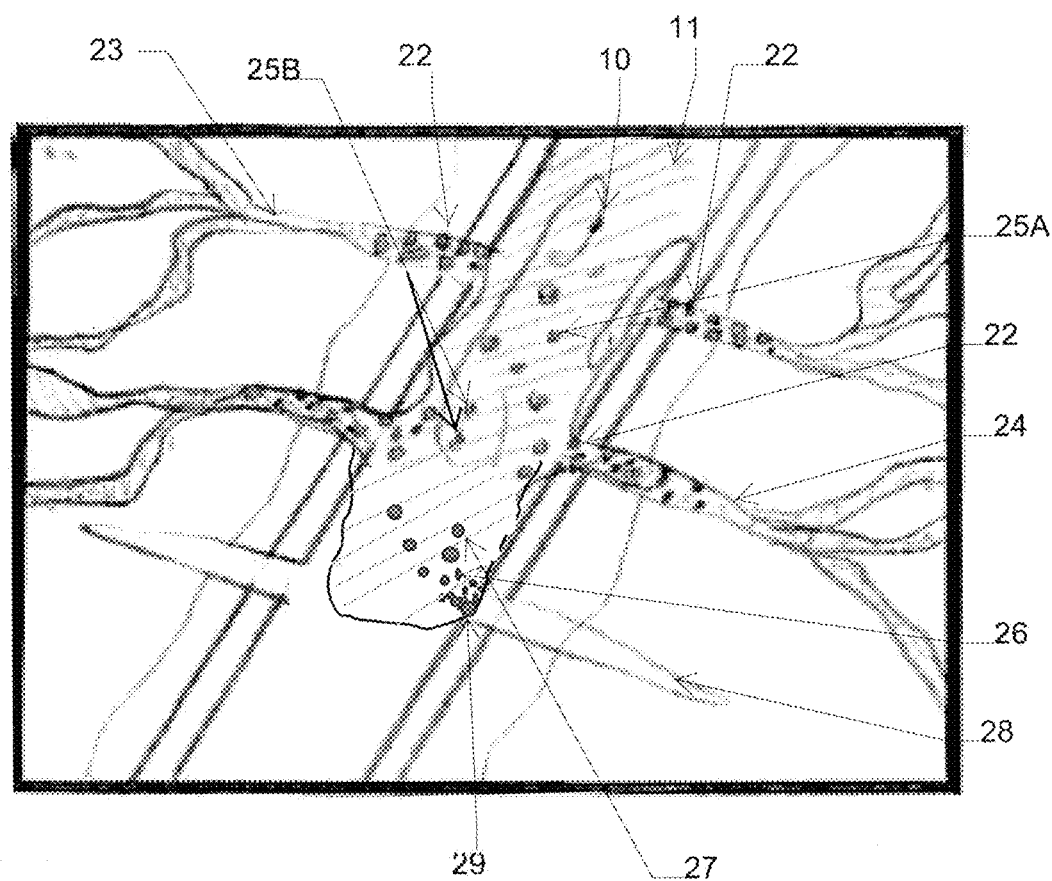

FIG. 2 shows another embodiment of the disclosure wherein a high permeability zone 23 of the formation may be blocked by dissolvable diverter 22 disassociated from the well treatment composite of fluid pill 10. Permeability of higher permeability zone 23 is reduced by the packing of the fracture. A portion of modified fluid pill 25 having a composite containing deformable particulates and less dissolvable diverter 22 than in fluid pill 10 proceeds to flow to lower permeability zone 24. Dissolvable diverter 22 from modified fluid pill 25 temporarily bridges the fracture of lower permeability zone 24. Further modified pill 27 having a core containing little, if any, dissolvable diverter, then proceeds to a zone of even lower permeability 28. Once the fractures have partially closed, the displacement fluid may be pumped (or displaced via the short pumping burst) and the gelled fluid containing the deformable particulates continue to bridge off until a plug is built up in the wellbore. Fluid-impermeable plug 29 is formed from the deformable particulates 26 of the core of modified pill 27 at the face of the fracture in lower permeability zone 28 by the formation of a thickened gel from the interaction of the crosslinking agent and viscosifying agent.

The fracture in the zone of lower permeability may (at least partially) close by varying the pumping rate of the displacement fluid while the well treatment composite remains suspended within the fluid pill. The pumping of the fluid pill in the wellbore is typically stopped or the rate of pumping is reduced and the well treatment composite remains suspended within the fluid pill while the fluid pill is stationary within the wellbore. The fluid pill needs to remain stationary for a period of time long enough to allow the fractures in the formation to at least partially close sufficiently to ensure particulate bridging. The amount of time needed may vary depending on various factors, including the composition of the formation and various components of the fracturing fluid, such as the type and concentration of polymer in the fracturing fluid, the degree of crosslinking, amount of breaker, volumes of fluid used etc. Various computer models may be used to estimate the fracture closure time after the pumping has stopped as would be appreciated by one of ordinary skill in the art. In an embodiment, the well may be shut-in for 30 minutes or less, preferably from about 10 to about 30 minutes, prior to pumping of the displacement fluid. Use of deformable particulates of larger particle size distributions may accelerate, i.e., shorten, the requisite shut-in period.

The following examples are illustrative of some of the embodiments of the present disclosure. Other embodiments within the scope of the claims herein will be apparent to one skilled in the art from consideration of the description set forth herein. It is intended that the specification, together with the examples, be considered exemplary only, with the scope and spirit of the disclosure being indicated by the claims which follow.

All percentages set forth in the Examples are given in terms of weight units except as may otherwise be indicated.

EXAMPLES

The following designations are used in the Example:

A: a 90:10 v/v mixture of phthalic anhydride:phthalic acid, 20/40 mesh, melting range[1]: 268-270° F.;

B: a 85:15 v/v mixture of phthalic anhydride:phthalic acid, 8/50 mesh, melting range: 268-356° F.;

C: polylactic acid, 14/70 mesh, melting range: 298-329° F.;

D: polylactic acid, 10/70 mesh, melting range: 336-345° F.

C&D were prepared by grinding pellets of polylactic acid, commercially available as INGEO® 4340-D from NatureWorks LLC, to the designated size.

[1] Melting range represents the temperature at which the solid started to soften to when it was completely melted.

[2] Undissolved sample, not starting material.

Example 1

A well treating composite having a deformable core particulate and a hardened coating was prepared using, as particulate, LiteProp™ 125, commercially available from Baker Hughes Incorporated, by spraying and drying onto the particulate in sequential steps: (1) 10 lb/Mgal sodium carbonate, (2) 2 lb/gal sodium tetraborate and (3) 40 lb/Mgal guar. The process used a fluid bed coating apparatus having a Glatt coater wherein warm air was blown through the perforated plates below the bed of particulates. The apparatus was operated about at 120° F. to facilitate driving off the water. At times, there was a relatively short period following each spray while the bed was continuing to be fluidized in order to complete drying of a particular stage. A volume of a base fluid (250 ml of 2% KCl) was measured in a beaker and added to a variable speed Waring blender. The desired mass of the untreated particulate and coated particulate was measured using a balance. The Waring blender was turned on and set to a mixing speed of 1,500 RPM and the desired mass of the untreated or treated particulate was added to the base fluid in the blender jar. The samples were mixed in the blender at 1,500 rpm for about 5 minutes, and then transferred to a vessel for viscosity measurement. The additives amounts deposited on the particulate were sufficient for a 4 pound per gallon loading of the composite to deliver 40 lb/Mgal of guar accompanied with the appropriate concentrations of crosslinker and buffer to generate a robust crosslinked fluid.

The viscosities of the slurry compositions were measured using a Brookfield LDV-III Viscometer equipped with a #3 LV CYL cylindrical spindle (Brookfield Engineering Laboratories, Middleboro, Mass.) at a rotational speed of 0.3 rpm, resulting in an apparent shear rate of 0.063 sec-1. Slurry viscosities greater than 2,000,000 cP exceed the measurement capabilities of the instrument using this spindle/rotational speed combination.

| Sample | Concentration | Viscosity @ 0.063 sec$^{-1}$ at 5 min. |
| --- | --- | --- |
| Treated Particulate | 2 ppg | 362,000 cP |
| Untreated Particulate | 4 ppg | 399.8 cP |
| Treated Particulate | 4 ppg | 804,000 cP |
| Untreated Particulate | 6 ppg | 799.8 cP |
| Treated Particulate | 6 ppg | >2,000,000 cP |
| Untreated Particulate | 8 ppg | 4800 cP |
| Treated Particulate | 8 ppg | >2,000,000 cP |

The low shear rate Brookfield viscosities of the slurry samples including the composites exhibited viscosities as much as 2,000 times greater the observed for slurries of the untreated particulate.

Example 2

Phthalic anhydride (obtained from a commercial supplier) and Sample A (8 g of each) were first diluted in 100 mL deionized water or HCl 15% for 20 hours at 180° F., and then left for 3 hours at room temperature. The mixture was vacuum filtrated with 100 mL water and dried for 24 hours at 160° F. The results are set forth in Table I.

TABLE I

| Sample | Dissolved (%) | Melting Range[2], ° F. | Solvent |
|---|---|---|---|
| Commercial Phthalic Anhydride | 6 | 403 | Deionized water |
| Sample A | 7.5 | 401 | Deionized water |
| Sample A, crushed | 4 | 397-399 | Deionized water |
| Commercial Phthalic Anhydride | 4 | 412 | HCl 15% |
| Sample A | 0 | 410 | HCl 15% |
| Sample A, crushed | 16 | 415 | HCl 15% |

FTIR and melting point of the recovered undissolved samples showed that the remaining phthalic anhydride had converted into phthalic acid.

Example 3

Samples of Sample A (each 5 g) were diluted in 100 mL of either deionized water (DI) or tap water for (1) 54 hours at 180° F. and (2) 64 hours at 140° F. and then left to cool at room temperature. The solids were vacuum filtrated with 100 mL water and dried for 24 h at 160° F. The results are set forth in Table II.

TABLE II

| 64 hr PERCENT SOLUBILITY @ 140° F. | | 54 hr PERCENT SOLUBILITY @ 180° F. | |
|---|---|---|---|
| tap water | DI | tap water | DI |
| 18.5 | 13.4 | 5.6 | 9.3 |

The FTIR and melting point of the recovered undissolved samples showed that the remaining phthalic anhydride had converted into phthalic acid. Table II illustrates that more phthalic anhydride was converted to phthalic acid at higher temperatures. Sample A was thus more suitable for lower temperature applications.

Example 4

Different initial weights of Sample A were diluted in 18 mL of deionized water for 24 hours at 250° F. using a digestion vessel. After leaving the samples to cool, they were vacuum filtrated with deionized water and dried for 24 hours at 160° F. The results are set forth in Table III. The FTIR and melting point of the recovered undissolved samples showed that the remaining phthalic anhydride had converted into phthalic acid.

TABLE III

| Initial Weight (g) | % dissolved |
|---|---|
| 1 | 55.6 |
| 0.5 | 83.7 |
| 0.25 | 100 |
| 0.1 | 100 |
| 0.05 | 100 |
| 0.025 | 100 |

Example 5

Different initial weights of Sample C were tested for solubility by using a digestion vessel (at 250° F. for 24 hours) and diluting in 18 mL of DI water, using different sample concentrations. The results are set forth in Table IV.

TABLE IV

| Amount (g) | % Dissolved |
|---|---|
| 1.000 | 100 |
| 0.500 | 100 |
| 0.250 | 100 |
| 0.100 | 100 |
| 0.050 | 100 |
| 0.025 | 100 |

Example 6

Samples were dissolved in water and heated in a water bath. After reaching room temperature, the samples were filtered via a vacuum. The recovered material was then dried overnight and the percentage of dissolved solids was calculated based on the amount of sample retained on a Whatman #41 filter paper. All samples were allowed to dry for at least 24 hours at approximately 160° F. The samples (2.5 total) were then tested for solubility in 50 mL of deionized water using different temperatures (heating for 24 or 48 hours). The 1:1 mixture of Sample B and Sample C were made by mixing equal amounts of each product (1.25 g) and diluting in 50 mL total deionized water. The results are set forth in Table V:

TABLE V

| | 24 hr | | 48 hr | | |
|---|---|---|---|---|---|
| SAMPLE | 140° F. | 180° F. | 80° F. | 180° F. | 300° F. |
| B | 8.7 | 21.6 | 19.9 | 5.4 | 11.0 |
| B | 6.1 | n/a | 24.1 | n/a | 10.5 |
| C | 0.31 | 1.1 | 0.99 | 9.9 | 99.3 |
| C | 0.30 | n/a | 0.98 | n/a | 99.2 |
| B:C | 10.9 | 31.1 | 13.8 | 30.1 | 90.5 |
| B:C | 10.2 | n/a | 12.9 | n/a | 87.2 |

Example 6

Additional solubility tests were performed using Sample B and Sample D (2.5 g total) in 50 mL of deionized water using different temperatures (heating for 24 or 48 hr). The 1:1 mixture of Sample B:Sample D was made by mixing equal amounts of each product (1.25 g) and diluting in 50 mL deionized water. The results are set forth in Table VI:

TABLE VI

| | 24 hr | | 48 hr |
|---|---|---|---|
| SAMPLE | 150° F. | 180° F. | 150° F. |
| B | 24.8 | 21.6 | 16.5 |
| D | 0.2 | 0.24 | 0.1 |
| 1:1 B:D | 20.2 | 23.1 | 16.7 |

The Examples illustrate that phthalic anhydride/phthalic acid is more suitable as a diverting agent in lower temperatures (180-250° F.) applications and polylactic acid is more suitable as a diverting agent at higher temperature higher temperature (>250° F.) applications. The Examples further illustrate, based on the solubility results, that phthalic anhydride/phthalic acid acts enhances lowering the temperature at which polylactic acid dissolves. When mixed with polylactic acid, the Examples illustrate that phthalic anhydride/phthalic acid acts to enhance the activity of polylactic acid, while lowering the temperature at which polylactic dissolves. Thus, when mixed with phthalic anhydride/phthalic acid, polylactic acid may be used in lower temperature applications.

Example 7

Conductivity tests of a mixture of 13.52 g (85 wt. %) phthalic acid anhydride and 2.38 g (15 wt. %) LiteProp™ 125 lightweight proppant, a product of Baker Hughes Incorporated, having an apparent specific gravity of 1.25 at room temperature, were conducted. The tests were performed according to a modified API RP 61 ($1^{st}$ Revision, Oct. 1, 1989) using an API 10 conductivity cell with Ohio sandstone wafer side inserts to simulate the producing formation. The mixture was then loaded between the sealed sandstone wafers to increase the propped width. The mixture exhibited a density of about 0.5 lb/ft². The conductivity cell was then placed on a press and was subjected to a closure stress of 5,000 psi and a temperature of 200° F. De-ionized water was then allowed to flow through the test pack at 10 ml/min and the baseline conductivity determined. The cell was then shut off for 24 hours at which the flow of de-ionized water was resumed and Darcy flow maintained. The results are set forth in Table VII.

TABLE VII

| TIME, Hours | STRESS, psi | CONDUCTIVITY, md-ft | PERMEABILITY, Darcies | WIDTH, Mm |
|---|---|---|---|---|
| 0 | 5000 | 559 | 118 | 1.44 |
| 24 | 5000 | 2176 | 474 | 1.40 |
| 50 | 5000 | 6787 | 1478 | 1.40 |

After flow of 50 hrs, minor traces of the diverter could be seen at the outlet of the cell and negligible undissolved diverter at the inlet of the cell.

Preferred embodiments of the present disclosure offer advantages over the prior art and are well adapted to carry out one or more of the objects of this disclosure. However, the present disclosure does not require each of the components and acts described above and are in no way limited to the above-described embodiments or methods of operation. Many variations, modifications and/or changes of the disclosure, such as in the components, operation and/or methods of use, are possible, are contemplated by the patent applicant(s), within the scope of the appended claims, and may be made and used by one of ordinary skill in the art without departing from the spirit or teachings of the disclosure and scope of appended claims.

What is claimed is:

1. A method of building a plug in a horizontal wellbore which penetrates a subterranean formation, the method comprising:
(a) pumping a fluid pill into the wellbore wherein the fluid pill comprises a suspended well treatment composite, the well treatment composite comprising a core having a dissolvable diverter and a deformable particulate, a viscosifying agent and a crosslinking agent, wherein the viscosifying agent and crosslinking agent are coated onto the core;
(b) disassociating at least a portion of the dissolvable diverter from the core of the well treatment composite and rendering a modified fluid pill comprising the deformable particulate and viscosifying polymer and crosslinking agent coated onto the deformable particulate;
(c) blocking at least a portion of a high permeability zone of a subterranean formation with the disassociated dissolvable diverter;
(d) diverting the flow of the modified fluid pill from a high permeability zone to a lower permeability zone of a subterranean formation;
(e) allowing at least one fracture in the lower permeability zone of the subterranean formation to partially close;
(f) at least partially preventing the deformable particulate from entering the at least one fracture by forming a thickened gel containing the deformable particulate, wherein the thickened gel is formed by the in-situ reaction of:
(i) the crosslinking agent disassociated from the core; and
(ii) viscosifying polymer disassociated from the core; and
(g) forming a fluid-impermeable plug with the thickened gel containing the deformable particulate.

2. The method of claim 1, further wherein at least one of the following conditions prevail:
(i) prior to step (b), pumping a displacement fluid down the wellbore to displace the fluid pill into the formation; or
(ii) prior to step (f), pumping a displacement fluid down the horizontal wellbore to slowly displace the fluid pill after the at least one fracture in the zone has partially closed.

3. The method of claim 1, wherein the deformable particulate is an ultra lightweight (ULW) particulate.

4. The method of claim 1, wherein the core of the deformable particulate is porous.

5. The method of claim 1, wherein the suspended well treatment composite is neutrally buoyant in the fluid pill.

6. The method of claim 1, wherein the fluid pill further contains sand or a ceramic.

7. The method of claim 1, wherein the dissolvable diverter comprises at least one compound of the formula:

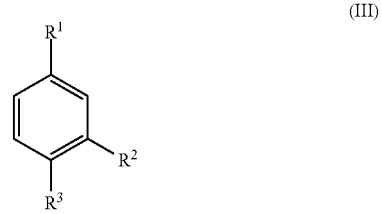

(III)

or an anhydride thereof
wherein:
$R^1$ is —COO—$(R^5O)_y$—$R^4$ or —H;
$R^2$ and $R^3$ are selected from the group consisting of —H and —COO—$(R^5O)_y$—$R^4$;
provided both $R^2$ or $R^3$ are —COO—$(R^5O)_y$—$R^4$ when $R^1$ is —H and further provided only one of $R^2$ or $R^3$ is —COO—$(R^5O)_y$—$R^4$ when $R^1$ is —COO—$(R^5O)_y$—$R^4$ $R^4$ is —H or a $C_1$-$C_6$ alkyl group;
$R^5$ is a $C_1$-$C_6$ alkylene group; and
each y is 0 to 5.

8. The method of claim 7, wherein the diverter further comprises an aliphatic polyester having the general formula of repeating units:

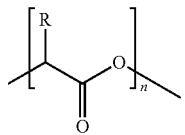

where n is an integer between 75 and 10,000 and R is selected from the group consisting of hydrogen, alkyl, aryl, alkylaryl, acetyl, heteroatoms, and mixtures thereof and aliphatic polyester is poly(lactide).

9. The method of claim 1, wherein the dissolvable diverter is selected from the group consisting of phthalic anhydride, terephthalic anhydride, phthalic acid, terephthalic acid, gilsonite, rock salt, benzoic acid flakes, polylactic acid and mixtures thereof.

10. The method of claim 1, further comprising, prior to step (g), applying a short pumping burst to displace the modified fluid pill after the fracture has partially closed.

11. A method of building a plug in a horizontal wellbore, the method comprising:
(a) pumping a fracturing fluid into the horizontal wellbore at a pressure sufficient to create or enlarge a fracture in the subterranean formation penetrated by the wellbore;
(b) pumping into the wellbore a fluid pill having a well treatment composite suspended therein, the well treatment composite comprising a solid core comprising a dissolvable diverter and a deformable particulate and a viscosifying polymer and crosslinking agent coated onto the core;
(c) pumping a displacement fluid down the wellbore and displacing the fluid pill further into the wellbore in proximity to a perforation tunnel in a desired location;
(d) flowing the fluid pill into a high permeability zone, blocking at least a portion of the higher permeability zone with the dissolvable diverter, forming a modified fluid pill and flowing the modified fluid pill into a lower permeability zone of the formation, wherein the modified well treatment composite has a core comprising the deformable particulate and viscosifying polymer and crosslinking agent coated onto the deformable particulate;
(e) allowing at least one fracture within the horizontal wellbore to at least partially close, the modified well treatment composite remaining suspended within the modified fluid pill;
(f) pumping the displacement fluid down the horizontal wellbore to slowly displace the modified fluid pill;
(g) increasing the viscosity of the modified fluid pill to form a gelled fluid by the in-situ reaction of:
(i) the crosslinking agent as it is disassociated from the deformable core; and
(ii) viscosifying polymer disassociated from the deformable core; and
(h) at least partially preventing the gelled fluid containing the deformable particulate from entering the at least one fracture in the zone, wherein the gelled fluid forms a fluid-impermeable plug within the wellbore.

12. The method of claim 11, wherein the diameter of the deformable particulate in the fluid pill is greater than the diameter of a proppant used during fracturing of the wellbore.

13. The method of claim 11, wherein the at least one fracture in step (e) is at least partially closed by varying the pumping rate of the displacement fluid.

14. The method of claim 11, further comprising, prior to step (f), stopping the pumping of the displacement fluid, wherein the modified fluid pill is stationary within the wellbore.

15. The method of claim 14, further comprising the step of varying the density of the deformable particulate such that the deformable particulate does not settle out while the fluid pill is stationary.

16. The method of claim 11, further comprising continuing pumping a fluid down the wellbore until a pressure rises within the wellbore.

17. The method of claim 11, wherein the dissolvable diverter comprises at least one compound of the formula:

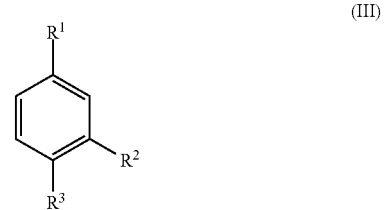

or an anhydride thereof
wherein:
$R^1$ is —COO—$(R^5O)_y$—$R^4$ or —H;
$R^2$ and $R^3$ are selected from the group consisting of —H and —COO—$(R^5O)_y$—$R^4$;
provided both $R^2$ or $R^3$ are —COO—$(R^5O)_y$—$R^4$ when $R^1$ is —H and further provided only one of $R^2$ or $R^3$ is —COO—$(R^5O)_y$—$R^4$ when $R^1$ is —COO—$(R^5O)_y$—$R^4$
$R^4$ is —H or a $C_1$-$C_6$ alkyl group;
$R^5$ is a $C_1$-$C_6$ alkylene group; and
each y is 0 to 5.

18. The method of claim 17, wherein the diverter further comprises an aliphatic polyester having the general formula of repeating units:

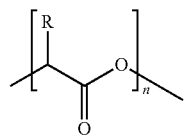

where n is an integer between 75 and 10,000 and R is selected from the group consisting of hydrogen, alkyl, aryl, alkylaryl, acetyl, heteroatoms, and mixtures thereof and aliphatic polyester is poly(lactide).

19. The method of claim 11, wherein the dissolvable diverter is selected from the group consisting of phthalic anhydride, terephthalic anhydride, phthalic acid, terephthalic acid, gilsonite, rock salt, benzoic acid flakes, polylactic acid and mixtures thereof.

20. The method of claim 11, wherein the deformable particulate is an ultra lightweight (ULW) particulate.

21. The method of claim 20, wherein the ULW deformable particulate is porous.

22. The method of claim 11, wherein the at least one fracture is at least partially closed in step (e) by reducing the pumping rate of the displacement fluid.

23. The method of claim 11, wherein the diameter of the deformable particulate is greater than the diameter of a proppant used during fracturing of the wellbore.

24. The method of claim 11, wherein the fluid pill in step (b) is pumped through a coiled tubing.

25. A method for building a plug in a horizontal wellbore comprising:
   (a) suspending a well treatment composite within a fluid, the well treatment composite comprising a core of a dissolvable diverter and a deformable particulate and a viscosifying polymer and crosslinking agent coated onto the core;
   (b) diverting the flow of the fluid pill to a low permeability zone of a subterranean formation penetrated by the wellbore;
   (c) dissolving the dissolvable diverter to provide a modified fluid pill comprising a modified well treatment composite having a core comprising the deformable particulate and viscosifying polymer and crosslinking agent coated onto the deformable particulate;
   (d) displacing the modified fluid pill;
   (e) allowing at least one fracture in the low permeability zone of the horizontal wellbore to partially close;
   (f) continuing to displace the modified fluid pill after the at least one fracture in the zone has partially closed, wherein a gelled fluid containing the deformable core bridges off forming a plug within the wellbore; and
further wherein during displacement of the modified fluid pill, the thickened gel is formed by the in-situ reaction of:
   (i) the crosslinking agent after being disassociated from the deformable particulate; and
   (ii) viscosifying polymer after being disassociated from the deformable particulate.

* * * * *